July 24, 1951  C. F. KLAGES  2,561,929
GLASS EDGING MACHINE
Filed May 27, 1948  3 Sheets-Sheet 1

Inventor
Chester F. Klages
by Christy,
Parmelee and Strickland,
his Attorneys

July 24, 1951  C. F. KLAGES  2,561,929
GLASS EDGING MACHINE
Filed May 27, 1948  3 Sheets-Sheet 2

Inventor
Chester F. Klages
By Christy, Parmelee and Strickland
his Attorneys

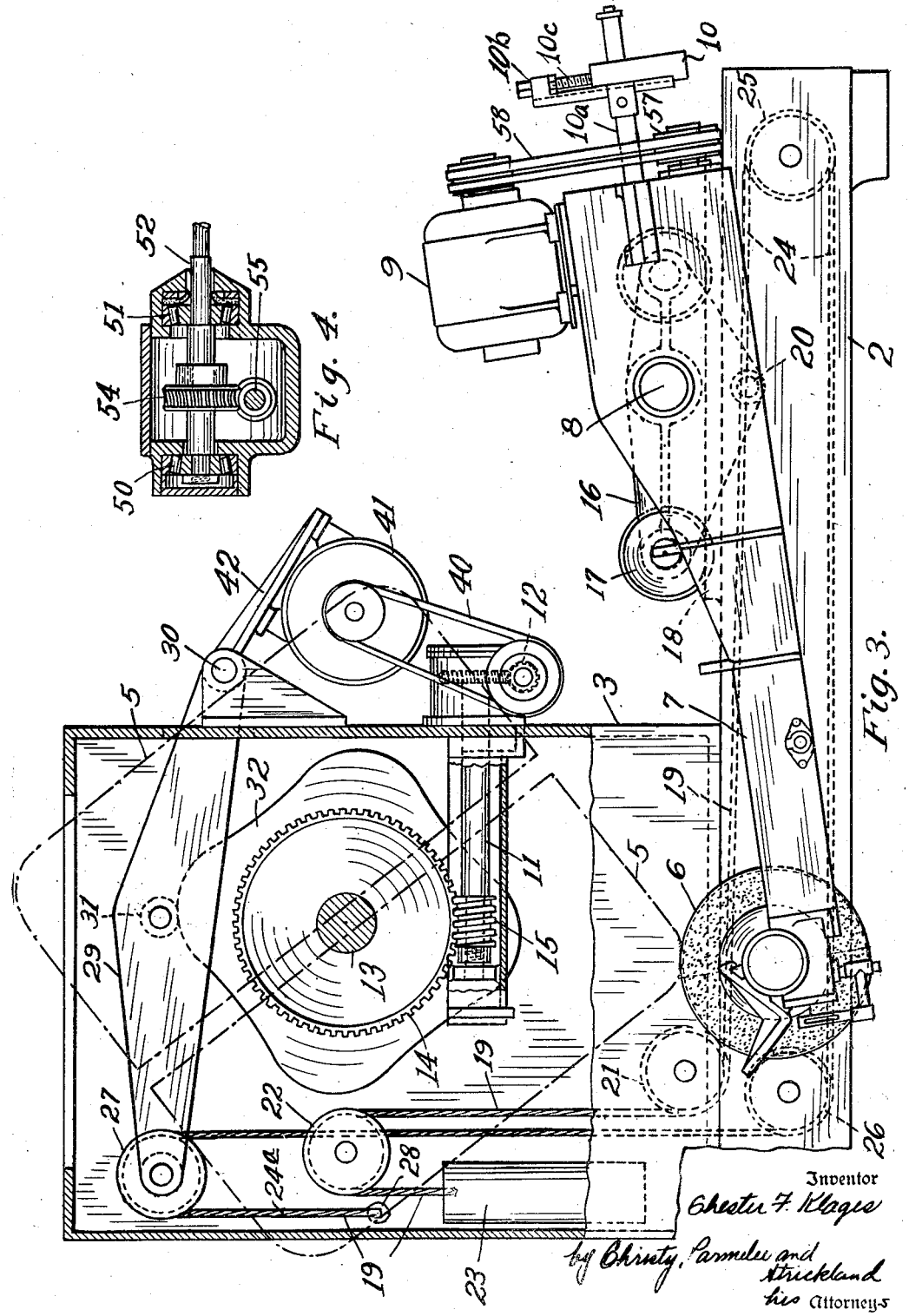

Patented July 24, 1951

2,561,929

UNITED STATES PATENT OFFICE 2,561,929

GLASS EDGING MACHINE

Chester F. Klages, Ross Township, Allegheny County, Pa., assignor to G. W. Klages & Son, Inc., a corporation of Pennsylvania Application May 27, 1948, Serial No. 29,430

6 Claims. (Cl. 51—51)

My invention relates to grinding or dressing the peripheral edges of plates, and is particularly directed to grinding the edges of plates or panes of shatterproof glass that are used in the windows of automobiles.

In the early stages of development of this art the panes of glass were ground manually; that is, a workman held the edge of the pane to be dressed against a rotating grinding wheel, and as the grinding progressed he slowly shifted the pane, advancing the edge in contact with the wheel and effecting the uniform grinding of the entire length of the edge to be dressed. The work was slow and costly, and a high degree of skill was essential.

In the progressive development of the art large automatic machines were constructed. Such machines comprised a chuck for supporting a number of panes in closely spaced parallel relation, and a grooved grinding wheel was mounted to bear yieldingly against the edges of the panes, with the edge of each pane received in one of the grooves in the wheel. The wheel was powerfully rotated, and during such rotation the plates were rotated in unison relatively to the wheel, whereby the edges of the panes were caused to advance through the points of contact of the grooves in the wheel with such edges, effecting the progressive grinding or dressing of the edges of all of the panes.

These machines were not satisfactory, because the edges of the panes were never finished uniformly. A slight irregularity in the edge of one pane in the machine caused that pane to receive either more or less (depending upon whether the irregularity was a protrusion or a recession in the extent of the edge) of the grinding effect of the wheel. This not only deprived the other panes of proper treatment, but resulted in the particular pane being subjected to too much or too little wheel pressure, with the consequent lack of uniformity of the work. Additionally, it was found that in such grinding of a large number of panes simultaneously a harmful vibration or chattering invariably developed in or between the panes and the wheel, in consequence of which the edges of many of the panes were marred by a minute chipping-away of the glass.

These and other objections promoted the development of more highly specialized machines, of the type shown in Letters Patent of the United States Nos. 2,080,280 and 2,293,828 granted on the applications of Norman Klages on May 11, 1937 and August 25, 1942, respectively. In the machines of these Letters Patent two panes were mounted in a rotating chuck. The two panes extended in common plane and were arranged to present in peripheral continuity those portions of the edges of the panes which were to be dressed. A single rotating grinding wheel was mounted on a delicately counterpoised arm, and such arm pressed the wheel with the precise pressure required against the substantially continuous peripheral edge formed by the two panes, and as the panes were slowly rotated in contact with the rapidly turning wheel the edge portions of the panes presented to the wheel were progressively ground and dressed.

In ultimate commercial form the latter machines were designed with two chucks adapted to rotate on a horizontal axis and to support a pair of panes in a vertical plane on each of the opposite sides of the machine, and a rotating grinding wheel was poised to operate on each side of the machine, whereby it became possible to work upon four panes upon each chucking-up or loading of the machine. It may be noted that machines of the type shown in these patents proved highly successful over a number of years. The quality of work was satisfactory, and the only adverse criticism was that the production was too low, requiring an investment in too many machines, with the attendant large requirements of floor space and of labor. If the high rate of production of the earlier machine described could be achieved with the quality of work obtained in the later machines, a solution of the problem long facing the art would be realized.

My present invention is aimed at a solution of this problem, and to such end the invention is centered in certain new and useful improvements in the construction of edge-grinding machines.

More particularly, the invention is embodied in the novel structural organization whereby two grinding wheels may be mounted on each side of an edge-grinding machine, with each wheel carried in a balanced arm that is individually responsive to all of the essential yielding movements, while being otherwise an integral component of a single machine unit. The rotating chucks of the machine are designed to support two pairs of panes in closely spaced parallel planes on each side of the machine, so that eight panes may be dressed in a single loading of the machine. The structural organization of four grinding wheels for independent operation to the full extend necessary upon four sets of panes is a major feature of the invention.

The invention will be described, by way of example, as it has been incorporated in, or applied to, the machine illustrated and described in Letters Patent No. 2,293,828, mentioned above. In the accompanying drawings:

Figure 3 is a diagrammatic view, showing the machine partly in vertical section and partly in side elevation, and illustrating certain elements of the machine in more advanced positions of operation than they appear in Figure 1;

Figure 4 is a view in cross section and to larger scale of the wheel-bearing end of one of the balanced arms of the machine, the plane of section being indicated at IV—IV in Figure 2;

Figure 5 is a fragmentary longitudinal section through one of the balanced arms, the plane of the section being indicated at V—V in Figure 2;

Figure 7 is a detailed view of a certain shaft that supports the grinding-wheel-supporting arms of the apparatus.

Figure 1:
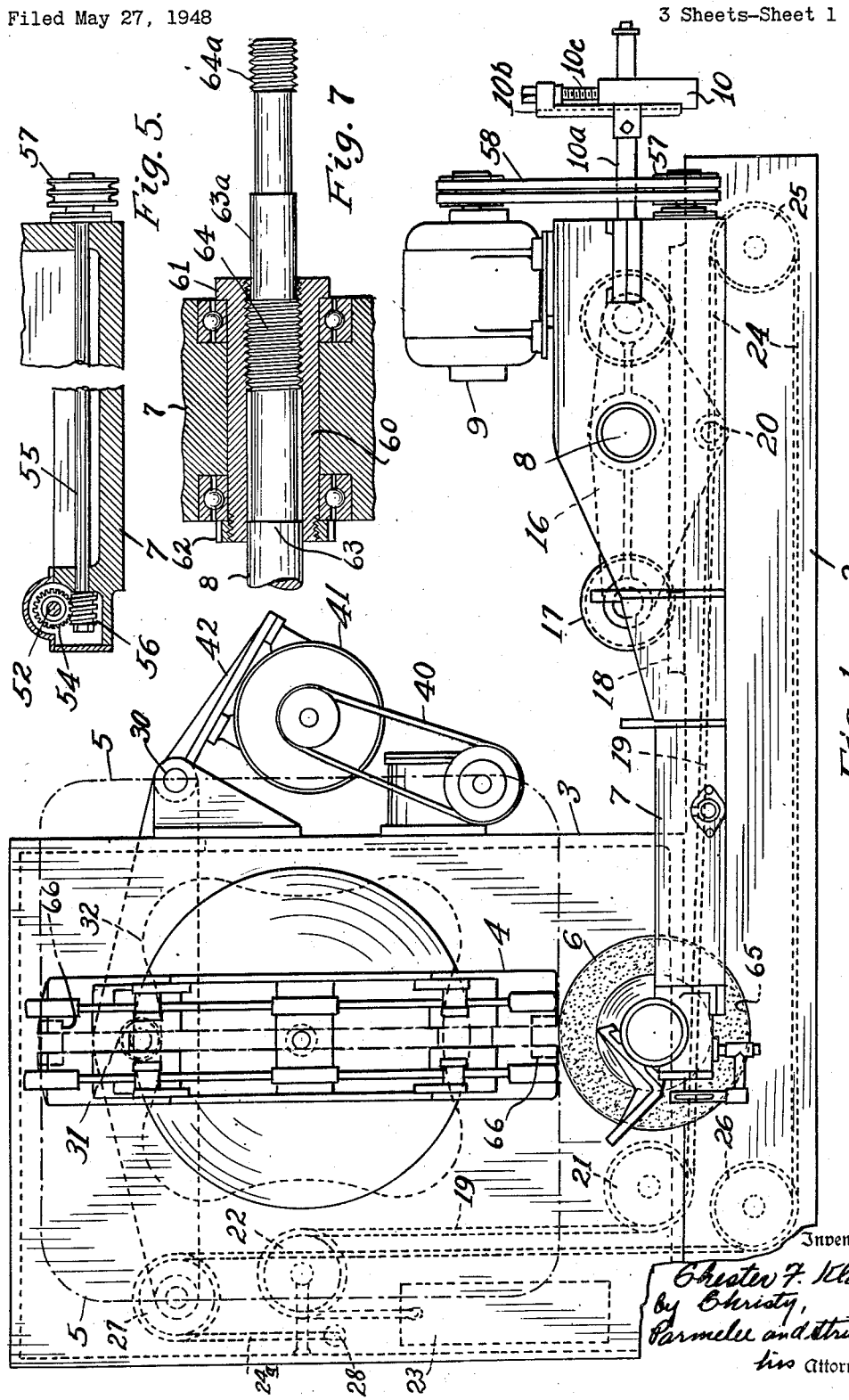
Figure 1 is a view of the machine in side elevation.

Referring to the drawings the machine includes a base 2 that supports a vertically extending housing 3. On each of the opposite sides of the housing (but one side appears in Figures 1 and 3 of the drawings) a rotary chuck 4 is arranged to support two pairs of glass plates or panes, the two panes of each pair (indicated by broken lines 5, 5) being secured in common plane, and the two planes being arranged in closely spaced relation, and extending normal to the axis of chuck rotation, which comprises, as shown in Figure 3, a chuck-supporting shaft 13. It may be understood that this shaft is journaled in the walls of the housing 3, and that the ends of the shaft extend from the opposite sides of the housing and carry the two chucks 4. The structure of the chucks 4 (Figure 1) is not a matter of immediate concern herein. Such devices are now known to the art, as also is the manner in which a braking drag may be imposed upon each chuck. (See Letters Patent No. 2,080,280). Suffice it to say that the chucks are adapted to support on each side of the housing 3 two pairs of panes 5, 5 in closely spaced planes.

Within the housing 3 a worm-gear 14 (Figure 3) is secured to the shaft 13, and a worm pinion 15 meshes with the gear. The pinion 15 is mounted on a drive shaft 11 that is connected through worm gearing 12 and belt drive 40 to an electric motor 41 carried by a bracket 42. The pinion 15 is rotated with an angular velocity that is alternately increased and decreased, to the end that the linear advance of the edges of the plates 5 through the points of contact with the grinding wheels 6 shall be alternately accelerated and retarded. The purpose for such variation in the speed of rotation of the plates or panes 5 is fully presented in the Letters Patent already noted herein, as well as the means which may be employed to effect the speed variation. These are not matters requiring description herein for those skilled in the art fully to understand my invention.

A grooved grinding wheel 6 is provided to operate upon the substantially continuous periphery of each of the four pairs 5, 5 of panes, and each of the four wheels is mounted on lever arm 7 fulcrumed or pivoted on a shaft 8. Each wheel 6 is borne at the distal end of its arm 7, at a substantial interval from and to one side of the fulcrum 8, while to the other side of the fulcrum the body of the arm may be weighted to cooperate with the weight of an electric motor 9. An adjustable counterweight 10 is also provided the counterweight 10 being adjustable both longitudinally and transversely of a supporting rod 10a extending outward from the arm. By properly positioning said weight 10, it becomes effective with the weight of the weighted end of the arm and motor 9, to counterbalance, or overbalance, the wheel-supporting portion of the arm by the degree required to maintain the wheel 6 with proper pressure yieldingly against periphery of the pair of panes 5, 5 upon which the wheel is to work.

Because of the range through which each lever arm 7 must swing as the grinding wheel moves from the middle of the straight edges of the panes to the corners of the panes, the effective length of the moment arm between the center of the fulcrum 8 of the lever arm and the center of gravity of the counterweight mass varies appreciably, and it is not possible to obtain the desired precision of counterweight effect by merely adjusting the weight 10 along the supporting rod 10a which comprises, manifestly, a continuation of the longitudinal axis of the lever arm. However, I have found that by also adjusting the counterweight 10 transversely of the rod 10 the required precision of counterbalancing effect is obtained over the operating range of swing of the lever arm. For this purpose the counterweight 10 straddles the rod 10a, and is mounted in a slideway 10b that is adjustable longitudinally of rod 10a and on such slideway a screw 10c is arranged to adjust the weight 10 transversely of the rod 10a.

The shaft 8, on which the two pairs of arms 7 are fulcrumed, is supported in a carriage 16 adapted to travel on wheels 17 that ride a pair of rails 18. The rails are mounted on a portion of the machine base 2 that extends horizontally to the rear of the housing 3, and it will be understood that these rails, as viewed in plan from above the machine, run in a direction normal to axis of the shaft 13 on which the two chucks 4 rotate the four sets 5, 5 of panes.

The four arms 7 that severally carry the four grinding wheels 6 are arranged in two pairs, one pair on each side of the carriage 16 for operation upon the edges of the two pairs of panes chucked on opposite sides of the housing 3. The particular structure and organization of the two arms 7 in each pair, to permit the wheels of each pair to operate effectively with individual yielding pressure upon the glass, constitute a feature of major importance. It will be noted that the wheels 6, 6 of each pair of arms 7 are borne in closely facing relation between the arms of the pair, and the bearing for the wheels in the ends of the arms may be termed cantilever bearings. A consideration of Figure 4 will illustrate the bearing structure. The hollow terminal of each arm 7 forms a journal box, in which two antifriction bearings 50 and 51 are retained in spaced relation to provide support for the rotatable shaft 52. From such spaced twin bearings the shaft 52 projects, extending from the housing as a cantilever shaft whose distal end provides the rotary support for the associate grinding wheel 6. Cooperating with the improved bearing arrangement is a special drive mechanism, comprising a worm-gear 54 fixed on shaft 52. A drive shaft 55 extends longitudinally from one end of the arm 7 to the other, and at one end this drive shaft carries a worm pinion 56 that meshes with the gear 54, while at opposite end the drive shaft projects from the body of the arm and is equipped with the pulleys 57 (Figure 5) of a V-belt drive 58 (Figure 1) connected to motor 9. The worm gears 54, 56 and the V-belt drive 57, 58 may be described as gearing located at spaced-apart points on the drive shaft 55 for connecting the motor 9 to the grinding wheel to be powerfully rotated. This drive mechanism contained substantially within the body of the arm 7, together with the cantilever bearing for the grinding wheel, permits of the effective structural organization of the four arms 7, pair by pair on opposite sides of the machine. Each of the four wheels is minutely responsive to the reaction of its rotating periphery in engagement with the edge of a pane, even though all of the wheels are effective in unison, more or less, to other machine movements now to be considered.

The lever arms 7 of each pair are minutely adjustable along the axis of the supporting shaft 8, so that the grooves in the grinding wheels carried thereby may be severally arranged in perfectly aligned position with respect to the engaged edges of the panes borne by the rotating chucks 4. The fragmentary showing of Figure 7 indicates how each arm 7 is mounted with ball bearings upon a sleeve 60. The sleeves is provdied on one end with a shoulder 61 and at opposite end with a nut 62, between which the inner rings, or raceway elements of the ball bearings are clamped. The shaft 8 is provided with a journal portion 63 and a threaded portion 64 of equal diameter, and the internal bore of the sleeve 60 is appropriately formed for engagement with such journal and threaded portions of the shaft. In order to adjust the arm 7 laterally, that is, axially of the shaft 8, and so bring the groove in the grinding wheel carried by such arm into exact alignment with the edges of the panes engaged thereby, the nut 62 is loosened by means of a spanner wrench, and then the sleeve is rotated in one direction or the other, as required, to move the sleeve either inward or outward on the shaft 8, thus shifting the arm 7 accordingly and with the desired lateral adjustment of the grinding wheel relatively to the work.

The companion of the arm 7 shown in Figure 7 is mounted on the outer end of the shaft 8 in the same manner as that described of the arm shown. It only need be noted that the shaft portions 63a and 64a are of smaller diameter than the portions 63 and 64, so that the sleeve 60 of the inner arm 7 may be passed freely over the outer end of the shaft and mounted in the position shown. Thus, each of the two arms mounted on each end of the shaft 8 may be adjusted easily and with a high degree of precision.

A flexible tension member 19 (say of wire rope or link chain) is anchored to the carriage at 20, and extending forwardly from such point of anchorage (to the left in Figure 3) the tension member 19 is trained over pulleys 21 and 22 that are suitably mounted in the framework of the machine. The tension member carries a weight 23 at its otherwise free end, and under the effect of this weight the carriage tends constantly to move forwardly (right to left) on the rails. Opposing the effect of the tension member 19 on the carriage is a tension member 24; this tension member 24 is anchored to the carriage in common with member 19, but it extends from the carriage in opposite direction, and is trained over a pulley 25 journaled in the base of the machine; from pulley 25 the member 24 passes over pulleys 26 and 27 and is anchored, as at 20, to the stationary housing of the machine. The pulley 26 is mounted in the base of the machine, while the pulley 27 is carried by the distal end of an arm 29 that is pivoted to the housing 3 on a pin 30. The arm 29 carries intermediately a wheel 31 that bears upon the edge of a cam-disc 32 keyed to the shaft 13. The tension imposed by weight 23 on flexible member 19 is manifestly effective upon flexible member 24, and such tension, intended as it is to shorten the bight 24a in member 24, exerts a downward pull on the pulley-bearing end of arm 29, holding the wheel 31 to the edge of the cam 32. The cam 32, slowly rotating in unison with the shaft 13, effects the angular oscillation of the arm 29 on its pivot 30, alternately raising and lowering the pulley 27, and alternately increasing and decreasing the length of the bight 24a in flexible tension member 24. In consequence, the carriage 16 is caused slowly to move on the rails 18, backwards and forwards, slowly reciprocating the arms 7 is horizontal direction, and correspondingly shifting the rapidly rotating grinding wheels in engagement with the edges of plates 5. As already mentioned, the angular velocity of the chuck-rotating shaft 13 is automatically varied, and it will be perceived that, with the cam 32 keyed to such shaft, the movement of the reciprocating carriage, together with the arms 7 and grinding wheels 6 borne thereby, is accelerated and retarded in coordination with the changes in the rotational velocity of the chuck-borne plates 5. The cam 32 is so particularly patterned as to provide the most effective reciprocative movement of the rotating grinding wheels in engagement with the edges of the rotating plates 5.

The arm 7 of each pair of arms carries a freely rotatable cam wheel 65 which is adapted to engage cam portions 66 (Figure 1) mounted in the chucks to span the interval between the edges of the panes of glass, in order to "carry" the grinding wheels across such spaces without "biting" the corners of the panes. This is a detail which is illustrated and described in prior Patent No. 2,080,280. Similarly, cams may, if desired, be mounted to guide the wheels at the outer sharply rounded corners of the panes. This specification is not concerned with the known structure, by means of which a single rotating grinding wheel may be carried across the space between the panes or around the corners of the panes, other than to the extent the cam and cam wheel of the grinding wheel on one arm 7 may be caused to serve the grinding wheel of the companion arm 7.

Figure 2:
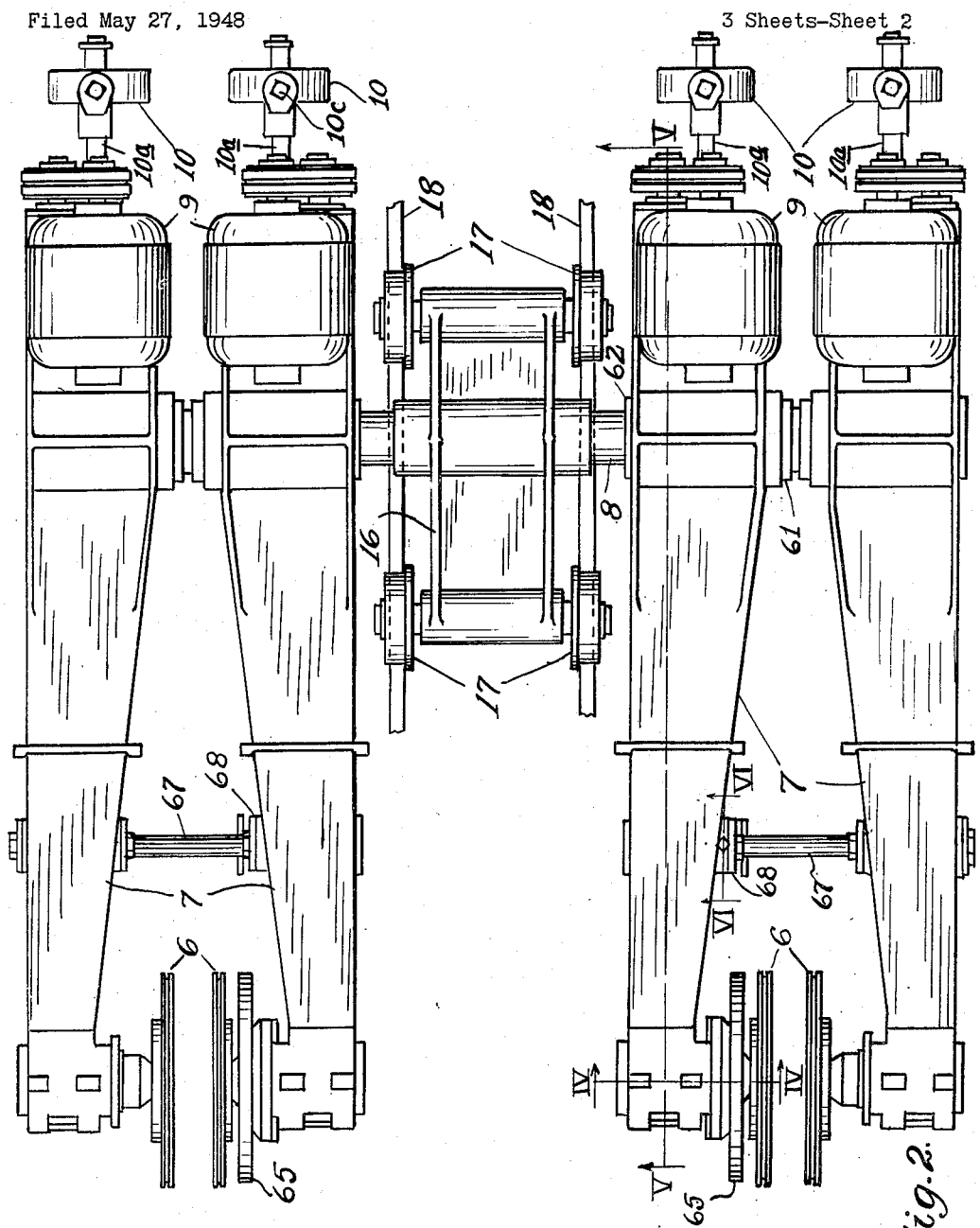
Figure 2 is a view of the supporting structure for the four grinding wheels of the machine, the view being in plan and to larger scale.
Figure 6:
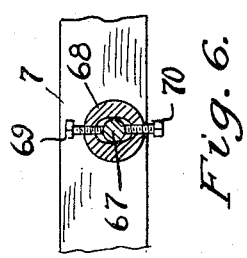
Figure 6 is a detailed view, showing a fragment of one of the grinding-wheel-supporting arms, as seen on the section plane VI—VI of Figure 2.

Considering Figure 2, it will be understood that the outer arm 7 of each of the two pairs of arms is provided with a rigid member 67 that extends to and into a socket portion 68 on the inner or companion arm. There is a play or lost motion between the socket portion 68 and the rigid connecting member, whereby a limited relative swinging movement between the two arms of each pair is permitted, this relative movement being sufficient to permit the individual response of each arm to the slight variations in the edges of the panes being ground by wheel on each arm. As shown in Figure 6, the socket portion 68 is provided with opposed set screws 69 and 70, to the end the degree of lost motion may be accurately established to the required degree, no more, no less. While the two arms of each pair are thus effective as individually responsive wheel supports during the normal grinding operation along the edges of the panes, it will be understood that when the guide wheel 65 on the inner arm 7 of the pair engages and rides a cam 66 on the chuck (the movement of the arm carrying the wheel 65 is adequate to overcome the lost motion and thereby the connecting member 67 causes the outer arm to move with the inner arm. The grinding wheel on the outer arm of each pair is carried across the spaces between the panes it is working on to the same extent as is the grinding wheel on the inner arm carried over the spaces between the panes it is working upon. Thus it will be seen that the device 67—70 serves to synchronize the position of the outer arm with respect to the inner arm when the cam 66 is engaged by the wheel 65. The results are very satisfactory, and great simplicity of construction is thus realized.

Various modifications and variations of the structure described lie within the field of invention defined in the appended claims.

I claim:

1. In edge finishing apparatus having a chuck arranged to support plates in four spaced parallel planes for rotation on the axis of the chuck, mechanism geared to said chuck for rotating it, means for yieldingly supporting four rotating grinding wheels severally against the edges of the plates in said planes, said means comprising a base, a carriage mounted on said base for movement on a line extending transversely of the axis of plate rotation, two pairs of arms and means for pivotally supporting said arms one pair on each of the opposite sides of said carriage, a shaft carried by each arm at an interval from one side of its pivotal support for rotatably mounting one of said rotating wheels, and means for effecting a regulated reciprocation of said carriage on said line of movement while the wheel-engaged plates are in rotation; the invention herein described wherein the two wheel-mounting shafts of each pair of arms are arranged to extend laterally from the arms as cantilever members, the distal ends of said cantilever shafts being directed toward each other into juxtaposition for the support of said wheels in parallel, closely spaced side-by-side relation, the arms of each pair being relatively movable on their pivotal supporting means, and an adjustable lost-motion device connected to the arms of each pair for limiting the range of the relative movement of the arms of the pair.

2. In an edge grinding machine, a grinding wheel support comprising an arm and means for pivotally supporting said arm at a point intermediate its extent, a grinding wheel rotatably mounted on said arm at an interval from one side of its pivotal support, a drive shaft borne by and extending longitudinally of said arm, gearing connecting said shaft to said grinding wheel; the invention described comprising an electric motor mounted on said arm at an interval from the other side of said pivotal support and at an interval above said drive shaft in counter-poising relation with respect to said grinding wheel, and a flexible belt-and-pulley connection between said motor and drive shaft.

3. In an edge grinding machine, a grinding wheel support comprising an arm and means for pivotally supporting said arm at a point intermediate its extent, a grinding wheel rotatably mounted on said arm at an interval from one side of its pivotal support, a drive shaft borne by and extending longitudinally of said arm, gearing connecting said shaft to said grinding wheel; the invention described comprising an electric motor mounted on said arm at an interval from the other side of said pivotal support and at an interval above said drive shaft in counter-poising relation with respect to said grinding wheel, a flexible belt-and-pulley connection between said motor and drive shaft, a counterweight, a counterweight-supporting member extending longitudinally of the direction of extent of said arm, means for securing said counter-weight on said supporting member in a position of adjustment selected longitudinally thereof, and means for securing said counterweight in a position of adjustment selected transversely of said supporting member.

4. In an edge finishing apparatus comprising a rotary chuck having devices for supporting plates in two spaced parallel planes, a cam portion on said chuck, mechanism geared to the chuck for rotating it, a pair of arms pivotally mounted in common at points intermediate their extents on a fulcrum spaced from the axis of rotation of said chuck, a grinding wheel rotatably mounted on each arm at an interval from said fulcrum, means acting on said arms for swinging them on their fulcrum to press said grinding wheels severally against the edges of the plates in said two planes, and means geared to each grinding wheel for powerfully rotating it; the invention herein described comprising a cam wheel on one of said arms arranged for engagement with said cam portion on the chuck to control the position of such arm and the grinding wheel borne thereby, and a lost-motion device interconnecting said arms, whereby the arms, otherwise independently movable on their fulcrum within the limits of said lost-motion device, are constrained to common movement when the cam wheel engages said cam portion.

5. In an edge-finishing machine comprising a fulcrum shaft having two arms mounted thereon, and two grinding wheels rotatably supported upon said arms severally, the combination of means for the adjustment of said arms longitudinally of said shaft to vary the lateral position of either grinding wheel and to modify the lateral spacing of the wheels comprising a sleeve engaged to each arm, with each sleeve in threaded engagement with said shaft, and means for so far releasing the engagement of sleeves with their arms as to permit rotation of the sleeves to effect said adjustment.

6. In a pivotally mounted arm of a grinding machine having a grinding wheel mounted on the arm at an interval from one side of the axis of the pivotal mounting, and a counter-poising device arranged on said arm at an interval from the opposite side of said axis; the invention herein described wherein said counter-poising device comprises a counterweight, a counterweight-supporting member extending longitudinally of the direction of extent of said arm, means for securing said counterweight on said supporting member in a position of adjustment selected longitudinally thereof, and means for securing said counterweight in a position of adjustment selected transversely of said supporting member.

CHESTER F. KLAGES.

REFERENCES CITED

The following references are of record in the file of this patent:

UNITED STATES PATENTS

| Number | Name | Date |
| --- | --- | --- |
| 1,462,420 | Mikaelson et al. | July 17, 1923 |
| 1,553,167 | Hyde | Sept. 8, 1925 |
| 2,080,280 | Klages | May 11, 1937 |
| 2,084,138 | Gottschalk | June 15, 1937 |
| 2,195,054 | Wallace et al. | Mar. 26, 1940 |
| 2,293,828 | Klages | Aug. 25, 1942 |